United States Patent [19]
Fujimura

[11] 4,175,061
[45] Nov. 20, 1979

[54] METHOD OF MANUFACTURING RESISTOR PASTE

[75] Inventor: Kenji Fujimura, Hachiohji, Japan

[73] Assignee: Sumitomo Metal Mining Company Limited, Tokyo, Japan

[21] Appl. No.: 879,251

[22] Filed: Feb. 21, 1978

[30] Foreign Application Priority Data

Jul. 9, 1977 [JP] Japan .................................. 52-82154

[51] Int. Cl.$^2$ .............................................. H01B 1/08
[52] U.S. Cl. ..................................... 252/518; 252/520
[58] Field of Search ................... 252/518, 520; 106/53

[56] References Cited

U.S. PATENT DOCUMENTS

| | | | |
|---|---|---|---|
| 3,304,199 | 2/1967 | Faber, Sr. et al. ................ | 106/53 X |
| 3,778,389 | 12/1973 | Kasanami et al. .................... | 252/520 |
| 3,816,348 | 6/1974 | Popowich ............................. | 252/518 |
| 4,076,894 | 2/1978 | Langley et al. ................. | 252/518 X |

*Primary Examiner*—Benjamin R. Padgett
*Assistant Examiner*—E. Suzanne Parr
*Attorney, Agent, or Firm*—Watson, Cole, Grindle & Watson

[57] ABSTRACT

A method of manufacturing resistor paste having excellent voltage resistance properties, high resistivity and low TCR by fusing a mixture composed of 1 to 40 weight % of ruthenium dioxide, 40 to 85 weight % of lead oxide, 10 to 30 weight % of silica, 1 to 15 weight % of alumina and 0 to 5 weight % of another inorganic oxide at a temperature of 800° to 1,200° C., cooling and grinding the fused mixture, then adding a TCR modifier and an organic vehicle to the ground material, the TCR modifier being selected from the group consisting of 2 to 10 weight % $ZrO_2$; 3 to 15 weight % of $Al_2O_3$; 0.5 to 20 weight % of tin oxide and a mixture of 0.5 to 20 weight % of tin oxide and up to 15 weight % of $Al_2O_3$, the sum of which does not exceed 25 weight % with respect to the total weight of the ground material and organic vehicle, and blending the admixture.

10 Claims, No Drawings

METHOD OF MANUFACTURING RESISTOR PASTE

BACKGROUND OF THE INVENTION

1. Field of the Invention

This invention relates to a method of manufacturing a lead ruthenate-containing resistor paste having particularly excellent voltage resistance properties, high resitivity and low TCR.

2. Description of the Prior Art

Hitherto, various investigations have been conducted regarding the method of manufacturing resistor pastes in order to improve the characteristics or stability of the compositions which are then used for manufacturing resistor. Also, resistors manufacturers have been experimenting with the use of intercompound metals as the material for making inorganic resistors, and there are many issued patents directed to the making of resistors using ruthenium oxides. Among such patents, U.S. Pat. No. 3,304,199 discloses a composition containing 2 to 70% by weight of $RuO_2$, the rest being glass frit. However, when this composition is formed into a paste, printed and fired to form a resistor, and in spite of the fact that the glass frit in the composition usually contains PbO, pyrochlore-type compounds represented by a formula $Pb_2Ru_2O_6$ can not be found in the fired resistor even in the examination through X-ray diffraction. U.S. Pat. No. 3,778,389 teaches an electric conductor consisting of a composite oxide composed of PbO, which compounds have been $RuO_2$ and after blended together with glass frit and the addition of an organic binder, formed into a paste. Further, Japanese Pat. application No. 81296/1971 (Laid-open Print No. 8579/1972) discloses that a resistor containing $Pb_2Ru_2O_6$ is produced when a resistor paste composed of a mixture consisting of lead ruthenate, or lead ruthenate and $RuO_2$, and glass frit is fired.

Since the last-noted paste is obtained by first mixing ruthenium dioxide (or lead ruthenate) as a conductive component and glass frit as an inorganic binder, and then dispersing the mixture in an organic vehicle, the resistor formed by firing this mixture dose not have the conductive component and the glass frit in a uniform dispersion, and fluctuations in the initial resistance value of the resistor are likely to result. In addition, since the conductive portion and glass frit are present in a liberated state, the high voltage resistance properties are insufficient, and also the current noise level is unsatisfactory.

Meanwhile, U.S. Pat. No. 3,271,193 discloses the use of ruthenium resinates in combination with other resinate for glass forming such as lead resinate and silicon resinate. In this case, the dispersion of conductive component and inorganic binder is sufficiently uniform, but since the step of production of the resinate is complicated, the product lacks storage stability, and also the printing performance is insufficient. Therefore, the electric characteristics and the reliability as a resistor are insufficient.

The present inventors have conducted various studies and investigations with the object of obtaining a resistor paste which would overcome the above drawbacks and be excellent in high voltage resistance properties such that an improved resistor could be made therefrom. It was found that such a resistor could be obtained by firing a resistor paste which was manufactured by the method according to the invention as described hereinafter. Such a resistor has been found to have surprisingly excellent high voltage resistance properties as compared to prior-art resistors.

A further object of the present invention was to provide a method of manufacturing a resistor paste which would have less fluctuation in the initial resistance value, excellent resistance to high voltage, high resistivity, low TCR (temperature coefficient of resistivity) (value) and less current noise.

SUMMARY OF THE INVENTION

The foregoing objects were achieved by making a paste as follows: mixing ruthenium dioxide (as the conductive material) with lead oxide, silica and alumina (as the glass material) in such a manner that the total of these compounds is 95 to 100 weight %, and then fusing the mixture at a temperature of 800° to 1,200° C., followed by cooling and grinding the fused mixture, and thereafter when blending the resultant glass-containing conductive crystal with an organic vehicle, simultaneously adding a TCR modifier, the TCR modifier being selected from the group consisting of 3 to 15 weight % of $Al_2O_3$; 2 to 10 weight % of $ZrO_2$; 0.5 to 20 weight % of tin oxide; and a mixture of 0.5 to 20 weight % of tin oxide and up to 15 weight % of $Al_2O_3$, the sum of which does not exceed 25 weight % with respect to the total weight of the ground material and the organic vehicle.

DETAILED DESCRIPTION OF THE INVENTION

The proportions of the conductive material and glass material are 1 to 40% ruthenium dioxide, 40 to 85% lead oxide, 10 to 30% silica and 1 to 15% alumina, the % being by weight. Further, MgO, CaO, BaO, $B_2O_3$, SrO, CdO, SnO, $Bi_2O_3$, etc., as contained in the usual glass, may be contained therein in amounts of 0 to 5%. Ruthenium dioxide as the conductive material is suitably of the non-crystalline state from the standpoint of reactivity with respect to the glass material.

These materials are combined and fused at a temperature of 800° to 1,200° C., and after holding the fused combination for more than 30 minutes, it is cooled down by either pouring it into water or by natural cooling. If necessary, the cooled combination is dehydrated and finely ground by a grinding machine such as ball mill, and in order to impart a printing property, is mixed with an organic vehicle consisting of a suitable solution, e.g., a solution of pine oil and ethyl cellulose, which has been blended together with TCR modifier selected from the group consisting of 3 to 15 weight % of $Al_2O_3$; 2 to 10 weight % of $ZrO_2$; 0.5 to 20 weight % of tin oxide; and TCR modifier 0.5 to 20 weight % of tin oxide and up to 15 weight % of $Al_2O_3$, the sum of which does not exceed 25 weight %, i.e., to produce a resistor paste, the percentages being with respect to the total weight of the ground materials and organic vehicle added to the ground materials.

The resistor paste obtained in this way is screen-printed on an alumina substrate, and after drying at 125° C. for 20 minutes, a resistor is produced using the usual method of firing in a tunnel furnace at the highest temperature of 800° to 900° C. Then the resistance, the temperature coefficient of resistivity, the high voltage resistance property, the current noise and other electric characteristics are measured.

If the proportion of ruthenium dioxide contained in the material to be fused is less than 1 weight %, the resistivity of the ultimately produced resistor is too high. On the other hand, with a proportion above 40 weight % the glass content is too low, such that the mechanical strength is too weak (this being the role of the glass). Further, when the proportion of the lead oxide is below 40 weight %, the softening point is too high, and with elevation of the fusing temperature, the high voltage resistance of the product resistor tends to be deteriorated. Further, with a proportion above 85 weight %, a stable glass cannot be obtained. Furthermore, with a silica content of 10 weight % the glass matter cannot be obtained by fusion. On the other hand, with a content above 30 weight % the softening temperature of the glass is too high. Further, with an alumina content of 1 weight % the moisture resistance and chemical stability of glass are deteriorated, whereas with a content above 15 weight % the glass tends to be readily crystallized and becomes unsteady.

MgO, CaO, BaO, $B_2O_3$, SrO, CdO, SnO, $Bi_2O_3$ and so forth which are contained in the usual glass other than ruthenium dioxide, lead oxide, silica and alumina may be omitted. In case of adding these oxides, they do not give adverse effects upon the characteristics of the resistor to be described according to the invention so long as the their added sum is less than 5 weight %.

The fusing temperature of the material mixture is suitably within a range of 800° to 1,200° C.

When the holding period at the fusing temperature at the time of fusing is above 30 minutes, no particular difference in the nature of the product can be recognized. The cooling of the material mixture after fusing may be made by natural cooling or pouring it (in the fused state) into water. Quenching of the mixture is convenient since subsequent grinding can be readily performed.

According to the present invention, when adding an organic vehicle to the ground material containing $Pb_2Ru_2O_6$ and blending the mixture, a paste is produced by adding as TCR modifier one member selected from a group consisting of $ZrO_2$, $Al_2O_3$ and tin oxide to the ground material, the one member of which is selected from the group consisting of 3 to 15 weight % of $Al_2O_3$; 2 to 10 weight % of $ZrO_2$; 0.5 to 20 weight % of tin oxide; and a mixture of 0.5 to 20 weight % of tin oxide and up to 15 weight % of $Al_2O_3$, the sum of which does not exceed 25 weight % with respect to the total weight of the mixture of the ground material containing $Pb_2Ru_2O_6$ and the organic vehicle, thereby providing a paste with a high resistivity, a low TCR and a good thermal stability. With addition of amounts less than the above-mentioned lower limits no high resistivity can be obtained and the TCR becomes too high, while with addition of amounts greater than the above-mentioned upper limits the surface of the resistor becomes lusterless and the resistivity becomes unsteady.

EXAMPLE 1

A mixture composed of 15 weight % of ruthenium dioxide, 65 weight % of lead oxide, 17 weight % of silica, 2 weight % of alumina and 1 weight % of boron oxide was fused at 1000° C. for three hours so as to obtain a glass containing electro-conductive crystals. Analysis of X-ray diffraction of the crystals proved that the crystals were $Pb_2Ru_2O_6$.

A paste, sample No. 1, was prepared by blending a mixture of 70 parts by weight of the ground glass containing electro-conductive crystals and 30 parts by weight of pine oil solution of ethyl cellulose. Resistor pastes, samples No. 2 through 7, were prepared by grinding with a roll mill the predetermined amount of $Al_2O_3$ or $ZrO_2$ as TCR modifier added to the sample No. 1. These seven samples were printed on a substrate of 96% alumina by using a stainless screen of 200 mesh, dried at 125° C. for 20 minutes and then fired at 850° C. for 10 minutes so as to prepare the resistor. The results of measurement of the characteristics of the samples are shown in Table 1.

Table 1

| Sample No. | Kind of TCR modifier | Added amount (wt %) | Sheet resistivity (KΩ/sq.) | Variation coefficient of resistivity (%) | TCR (ppm/°C.) −30~25° C. | TCR (ppm/°C.) 25~125° C. | Current noise (db) | High voltage resistance (%) 1000V | High voltage resistance (%) 1600V |
| --- | --- | --- | --- | --- | --- | --- | --- | --- | --- |
| 1 | | | 8.2 | 3.26 | +340 | +353 | −16.2 | | |
| 2 | $Al_2O_3$ | 8 | 343 | 3.55 | −123 | −69 | −4.3 | −0.12 | −0.65 |
| 3 | $ZrO_2$ | 4 | 104 | 2.84 | +25 | +56 | −5.9 | −0.07 | −0.53 |
| 4 | $Al_2O_3$ | 2 | 13.5 | 2.85 | +257 | +257 | −8.6 | * | * |
| 5 | " | 3 | 41 | 2.76 | +152 | +161 | −8.4 | * | * |
| 6 | " | 4 | 60 | 2.94 | +35 | +57 | −6.5 | −0.22 | * |
| 7 | $ZrO_2$ | 2 | 60 | 3.25 | +56 | +83 | −5.7 | −0.41 | * |

*The resistivity is too low to be measured.

In the above Table, the sheet resistivity and current noise are measured by using a pattern of 2 mm in width by 2 mm in length, and the variation coefficient of the resistivity is obtained by calculation with respect to 30 measured values. As for the high voltage resistance, the value of 1,000 volts represents the rate of change obtained by comparing the resistance after application of a DC voltage of 1,000 V to a pattern of 2 mm in width by 4 mm in length for one minute with the resistance before application of the DC current. The value of 1,600 V is obtained through similar measurement by applying DC voltage of 1,600 V to a pattern of 2 mm in width by 2 mm in length for one minute.

As is seen from the results of Table 1, in Sample No. 1 the sheet resistivity is low and the TCR is high. With addition of the TCR modifier, the resistance is increased, the TCR is reduced, the current noise is reduced, and the high voltage resistance is increased.

EXAMPLE 2

A mixture consisting of 7.5 weight % of ruthenium dioxide, 69.4 weight % of lead oxide, 20.8 weight % of silica 1.9 weight % of aluminum oxide and 0.4 weight % of calcia was fused at a temperature of 1,000° C. for three hours, and then the fused mixture was cooled by pouring it into water, and then ground. Thereafter, 70 weight parts of the resultant glass powder containing conductive crystals was blended together with 30 weight parts of a pine oil solution of ethyl cellulose (containing 15 weight % of ethyl cellulose) by a roll mill to produce a paste of Sample No. 8. 100 weight parts of this sample was blended together with a predetermined quantity of tin oxide or a mixture of tin oxide and Al₂O₃ by a roll mill to produce pastes No. 9 to No. 15.

These pastes were printed on a substrate of 96% alumina by using a 200 mesh stainless screen, followed by drying at 125° C. for 20 minutes and firing at 850° C. for 10 minutes. Table 2 shows the results of measurements of the characteristics of the resultant resistors.

Table 2

| Sample No. | Kind of TCR modifier | Added amount (wt %) | Sheet resistivity (KΩ/sq.) | Variation coefficient of resistivity (%) | TCR (ppm/°C.) | | Current noise (db) | High voltage resistance (%) | |
|---|---|---|---|---|---|---|---|---|---|
| | | | | | −30~25° C. | 25~125° C. | | 10000V | 1600V |
| 8 | | — | 5.9 | 4.06 | +436 | +458 | −9.6 | * | * |
| 9 | Tin oxide | 0.3 | 43.4 | 3.68 | +307 | +310 | −12.7 | * | * |
| 10 | " | 0.5 | 81.0 | 3.24 | +156 | +184 | −15.8 | −0.07 | * |
| 11 | " | 2.0 | 670 | 3.15 | +5 | +63 | −9.7 | −0.01 | −0.11 |
| 12 | " | 10.0 | 2600 | 2.93 | −32 | +26 | −2.8 | −0.05 | −0.10 |
| 13 | " | 20.0 | 11500 | 3.76 | −314 | −236 | +6.2 | −0.23 | −0.46 |
| 14 | " | 22.0 | 16700 | 6.74 | −365 | −271 | +16.1 | −0.51 | −0.87 |
| 15 | " | 3.0 | | | | | | | |
| | Al₂O₃ | 4.0 | 960 | 2.23 | −166 | −79 | −5.2 | −0.04 | −0.16 |

*The resistivity is too low to be measured.

Table 3

| Sample No. | Sheet resistivity (KΩ/sq.) | Variation coefficient of resistivity (%) | TCR (ppm/°C.) 25~125° C. | Current noise (db) | High voltage resistance (%) |
|---|---|---|---|---|---|
| 16 | 191 | 6.72 | +26 | +5.2 | −11.4 |
| 17 | 130 | 5.41 | −75 | +10.5 | −27.3 |
| 18 | 425 | 8.65 | −152 | +15 or more | −13.4 |

From the above results, it will be seen that in the sample No. 8 which does not contain tin oxide the sheet resistivity is low, and the TCR is high. Also, even in sample No. 9 in which tin oxide is slightly added, the sheet resistivity is low. Further, although high sheet resistivity can be obtained with the sample No. 14 in which tin oxide is greatly added, the variation coefficient of the resistivity is large, so that the TCR and current noise are high, and high voltage resistance is deteriorated. In the Samples No. 10 to No. 13 and No. 15 according to the invention, the sheet resistivity can be increased, and the TCR is low. Also, current noise is low, and high voltage characteristics is excellent.

While in the above example, use has been made of SnO₂ as tin oxide, practically similar results can be obtained by using SnO.

Comparison Example

A paste produced as sample No. 16 by blending together 6 weight % of ruthenium dioxide, 64 weight % of glass frit of lead borosilicate and 30 weight % of pine oil solution of ethyl cellulose, a paste produced as sample No. 17 by blending together 10 weight % of lead ruthenate (Pb₂Ru₂O₆), 60 weight % of glass frit of lead borosilicate and 30 weight % of pine oil solution of ethyl cellulose and a paste produced as sample No. 18 by blending together 2 weight % of ruthenium dioxide, 5 weight % of lead ruthenate, 63 weight % of glass frit of lead borosilicate and 30 weight % of pine oil solution of ethyl cellulose were subjected to printing, drying and firing in the manner similar to Example 2 to produce resistors. Table 3 shows the characteristics of these resistors.

The composition of the glass frit of the lead borosilicate system comprises 70 weight % of lead oxide, 19 weight % of silica, 9 weight % of alumina and 2 weight % of boron oxide.

From the result of Table 3, it will be seen that in the resistors obtained by printing and firing the paste in the prior-art method, the current noise is high and the high voltage resistance is inferior.

What I claim is:

1. A method of manufacturing a resistor paste comprising the steps of
   (a) mixing together 1 to 40 weight percent ruthenium dioxide, 40 to 85 weight percent lead oxide, 10 to 30 weight percent silica, and 1 to 15 weight percent alumina to form a mixture,
   (b) fusing the mixture of step (a) at 800° to 1200° C.,
   (c) cooling and grinding the fused mixture of step (b), and
   (d) adding a TCR modifier and an organic vehicle to the cooled and ground mixture of step (c), said TCR modifier being selected from the group consisting of 2 to 10 weight percent of ZrO₂; 0.5 to 20 weight percent of tin oxide; and 0.5 to 20 weight percent of Al₂O₃, the sum of which does not exceed 25 weight percent with respect to the total weight of the ground material and organic vehicle.

2. The method of claim 1 wherein said TCR modifier consists of 0.5 to 20 weight percent of tin oxide, based on the total weight of ground material and organic material.

3. The method of claim 1 wherein up to 5 weight percent of inorganic oxides selected from the group consisting of MgO, CaO, BaO, B₂O₃, SrO, CdO, SnO and Bi₂O₃ are adding to mixing step (a).

4. The method of claim 1 wherein the fusing temperature of step (b) is maintained on the mixture of step (a) for more than 30 minutes.

5. The method of claim 2 wherein said tin oxide is selected from the group consisting of stannic oxide and stannous oxide.

6. The method of claim 1 wherein the cooling in step (c) is effected by pouring the fused mixture of step (b) in water.

7. The method of claim 1 including
   (e) blending the TCR modifier, organic vehicle and ground mixture of step (d).

8. The method of claim 1 wherein the TCR modifier consists of 3.0 weight percent of tin oxide and 4.0 weight percent of $Al_2O_3$.

9. The method of claim 1 wherein the organic vehicle comprises a pine oil solution of ethyl cellulose.

10. A method of manufacturing a resistor paste comprising the steps of (a) mixing together 1 to 40 weight percent ruthenium dioxide, 40 to 85 weight percent lead oxide, 10 to 30 weight percent silica, and 1 to 15 weight percent alumina to form a mixture,
    (b) fusing the mixture of step (a) at 800° to 1200° C., cooling and grinding the fused mixture of step (b), and
    (d) adding a TCR modifier and an organic vehicle to the cooled and ground mixture of step (c), said TCR modifier consisting of 2 to 10 weight percent of $ZrO_2$, based on the total weight of ground material and organic vehicle.

* * * * *